US007551545B2

(12) United States Patent
Krishnamoorthi (10) Patent No.: US 7,551,545 B2
(45) Date of Patent: Jun. 23, 2009

(54) SUBBAND-BASED DEMODULATION FOR AN OFDM-BASED COMMUNICATION SYSTEM (75) Inventor: Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1164 days.

(21) Appl. No.: 10/775,719

(22) Filed: Feb. 9, 2004

(65) Prior Publication Data
US 2005/0174931 A1    Aug. 11, 2005

(51) Int. Cl.
*H04J 11/00* (2006.01)
(52) U.S. Cl. ...................... 370/206; 370/210
(58) Field of Classification Search ................ 370/210, 370/208, 203, 206
See application file for complete search history.

(56) References Cited

U.S. PATENT DOCUMENTS

| 5,307,376    | A    | 4/1994  | Castelain et al. ............... 375/38  |
|--------------|------|---------|------------------------------------------|
| 6,282,167    | B1   | 8/2001  | Michon et al. ............... 370/203    |
| 6,549,561    | B2 * | 4/2003  | Crawford ..................... 375/137   |
| 6,711,123    | B1 * | 3/2004  | Taira ........................... 370/208 |
| 7,023,928    | B2 * | 4/2006  | Laroia et al. ................. 375/260  |
| 7,039,001    | B2 * | 5/2006  | Krishnan et al. ............. 370/203    |
| 7,116,741    | B2 * | 10/2006 | Duncan et al. ............... 375/355    |
| 2003/0081695 | A1   | 5/2003  | Eilts et al. ................... 375/316 |
| 2003/0128660 | A1 * | 7/2003  | Ito et al. ...................... 370/210 |

FOREIGN PATENT DOCUMENTS

| CL | 3085-2004 | 12/2004 |
|----|-----------|---------|
| EP | 0901259   | 10/1999 |
| EP | 1061704   | 12/2000 |
| RU | 2152131   | 6/2000  |

OTHER PUBLICATIONS

Alasti et al "A Discrete Multi Carrier Multiple Access Technique for Wireless Communications" IEEE (1998).
He et al "Computing Partial DFT for Comb Spectrum Evaluation" XP593173A vol. 3 No. 6 (Jun. 1996).

(Continued)

*Primary Examiner*—Min Jung
(74) *Attorney, Agent, or Firm*—Sandip S. Minhas; Stanton Braden (57) ABSTRACT For subband-based OFDM demodulation, a "partial" Fourier transform is performed on a sequence of N input samples for an OFDM symbol to obtain $N_c$ received symbols for a group of $N_c$ data subbands, where $N_c \cdot L = N$ and $L > 1$. For the partial Fourier transform, the N input samples are rotated with a phasor to obtain N rotated input samples, which are accumulated (for each set of L samples) to obtain $N_c$ time-domain values. An $N_c$-point FFT is performed on the $N_c$ time-domain values to obtain the $N_c$ received symbols. Channel gain estimates for the data subbands are also obtained, for example, by performing a partial Fourier transform to obtain received pilot symbols, an inverse FFT to obtain time-domain channel gain values, and an FFT to obtain channel gain estimates for the data subbands. The received symbols are processed with (e.g., equalized by) the channel gain estimates to obtain recovered data symbols.

9 Claims, 7 Drawing Sheets

OTHER PUBLICATIONS

Murphy et al "Low-Complexity FFT Structures for OFDM Transceivers" XP_002330376 IEEE Transactions On Communications, vo.1. 50, No. 12 (Dec. 2002).
International Search Report - PCT/US05/003581, International Search Authority - European Patent Office, Sep. 8, 2005.
Written Opinion - PCT/US05/003581, International Search Authority - European Patent Office, Sep. 8, 2005.
International Preliminary Report on Patentability - PCT/US05/003581, The International Bureau of WIPO, Geneva, Switzerland, Aug. 14, 2006.
International Preliminary Report on Patentability - PCT/US05/003581, IPEA - US, Sep. 29, 2006.

* cited by examiner

SUBBAND-BASED DEMODULATION FOR AN OFDM-BASED COMMUNICATION SYSTEM

FIELD

The present invention relates generally to communication, and more specifically to techniques for performing demodulation in an orthogonal frequency division multiplexing (OFDM) based communication system.

BACKGROUND

OFDM is a modulation technique that effectively partitions the overall system bandwidth into a number of (N) orthogonal subbands. Each subband is associated with a respective subcarrier that may be modulated with data. The subbands are also commonly referred to as tones, subcarriers, bins, and frequency channels.

OFDM is widely used in various communication systems. For example, an orthogonal frequency division multiple access (OFDMA) system utilizes OFDM and can support multiple users. The N subbands may be used for data and pilot transmission in various manners, depending on the system design. For example, the OFDMA system may partition the N subbands into multiple disjoint groups of subbands and allocate each subband group to a different user. Multiple users can then be supported simultaneously via their assigned subband groups.

In many instances, it is only necessary to demodulate a subset of the N subbands in an OFDM-based system. A straightforward method to process a subset of the N subbands is to perform an N-point fast Fourier transform (FFT) on time-domain samples to obtain frequency-domain symbols for all N subbands. The symbols for the subbands of interest are then extracted and processed, and the symbols for all other subbands are discarded. This straightforward method requires memory storage proportional to the N subbands and further requires computation for all N subbands, even if only a small subset of the N subbands is used for data transmission.

There is therefore a need in the art for techniques to more efficiently perform demodulation in an OFDM-based system when only a subset of the N subbands is used for data transmission.

SUMMARY

Techniques for performing subband-based OFDM demodulation are described herein. These techniques allow a receiver to perform processing for only the subbands of interest instead of all N subbands.

In one aspect, techniques for performing "partial" Fourier transform for $N_c$ subbands among N total subbands, where $N > N_c \geq 1$, are described. The $N_c$ subbands include every L-th subband among the N total subbands, where $N_c \cdot L = N$. To compute the partial Fourier transform for the $N_c$ subbands consisting of subbands m, m+L, and so on, a sequence of N input samples is rotated (by multiplying each input sample with a phasor $$W_N^{mn} = e^{-j\frac{2\pi mn}{N}})$$

to obtain a sequence of N rotated input samples. The sequence of N rotated input samples is then accumulated, for each set of L rotated input samples, which are spaced $N_c$ samples apart, to obtain a sequence of $N_c$ time-domain values. An $N_c$-point fast Fourier transform (FFT) is then performed on the sequence of $N_c$ time-domain values to obtain $N_c$ frequency-domain values for the $N_c$ subbands. The partial Fourier transform provides the frequency-domain values for the $N_c$ subbands using an $N_c$-point FFT instead of an N-point FFT.

In another aspect, techniques for performing channel estimation in an OFDM-based system are described. For this system, pilot symbols are transmitted on subbands in group p, and channel gain estimates for subbands in group m are desired. For the channel estimation, a partial Fourier transform is first performed on the sequence of input samples to obtain received pilot symbols for the subbands in group p. Channel gain estimates for the subbands in group p are then obtained by removing the modulation on the received pilot symbols. An IFFT is next performed on the channel gain estimates for group p to obtain time-domain channel gain values, which may be derotated with a phasor $W_N^{-pn}$ to obtain derotated time-domain channel gain values. To obtain channel gain estimates for group m, the derotated time-domain channel gain values are rotated with a phasor $W_N^{mn}$ to obtain rotated channel gain values for group m. The time-domain channel gain values may also be rotated with $W_N^{(m-p)n}$ to directly obtain the rotated channel gain values for group m. In any case, an FFT is performed on the rotated channel gain values to obtain channel gain estimates for the subbands in group m. Channel gain estimates for other groups of subbands may be obtained by processing the (derotated) time-domain channel gain values in similar manner, albeit with different phasors.

In yet another aspect, techniques for performing subband-based demodulation in the OFDM-based system are described. A partial Fourier transform is performed on the sequence of input samples to obtain received symbols for a group of subbands. Channel gain estimates for the group of subbands are also obtained. The received symbols are then processed with (e.g., equalized by) the channel gain estimates to obtain recovered data symbols for the group of subbands. Demodulation for other groups of subbands may be performed in similar manner.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. For clarity, in the following description, "sequence" is used for time-domain samples and values.

Figure 1A:
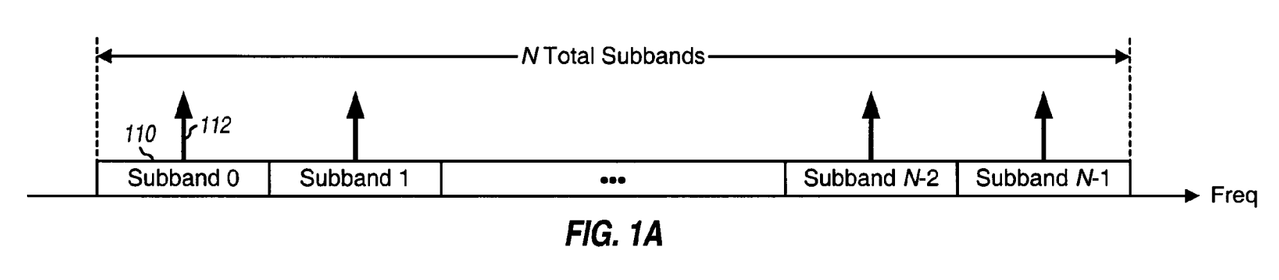
FIG. 1A shows an OFDM subband structure.

FIG. 1A shows an OFDM subband structure. An OFDM-based system has an overall system bandwidth of W MHz, which is partitioned into N orthogonal subbands 110 using OFDM. Each subband has a bandwidth of W/N MHz and is associated with a respective carrier 112 that may be modulated with data. The OFDM-based system may use only the center subbands for data and pilot transmission and reserve some subbands on the two ends as guard subbands to allow the system to meet spectral mask requirements. For simplicity, the following description assumes that all N subbands are used for transmission.

Figure 1B:
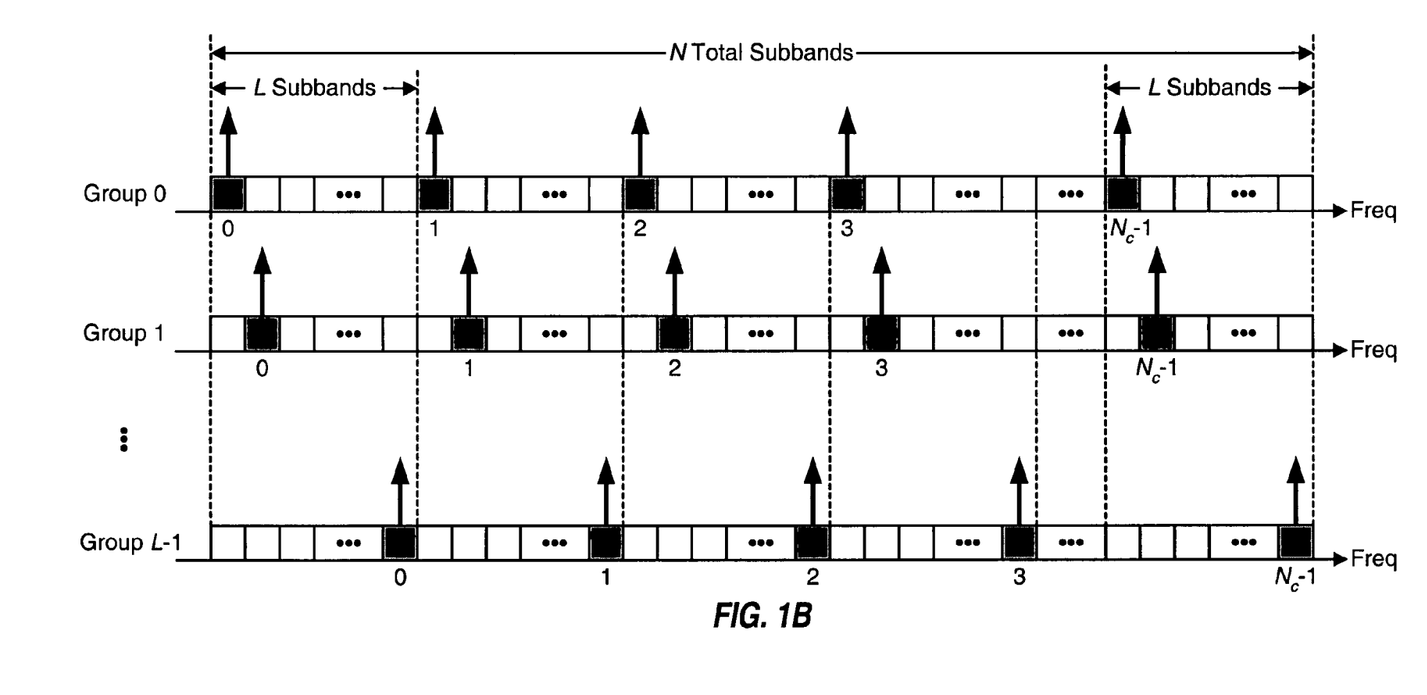
FIG. 1B shows a subband arrangement for an OFDM-based system.

FIG. 1B shows an exemplary frequency division multiplex (FDM) scheme for partitioning the N subbands in the OFDM-based system. For this FDM scheme, the N subbands are arranged into L disjoint groups, with each group including $N_c$ subbands, where $N_c \cdot L = N$. For example, the OFDM-based system may have N=4096 total subbands and L=8 subband groups, with each group including $N_c$=512 subbands. The L groups are disjoint in that each of the N subbands belongs to only one group. The $N_c$ subbands in each group are uniformly distributed across the N subbands such that consecutive subbands in the group are spaced apart by L subbands. The subbands in each group are thus interlaced with the subbands in the other L-1 groups. The N subbands may be partitioned in other manners. For simplicity, the following description assumes the subband arrangement shown in FIG. 1B.

With OFDM, one modulation symbol for either data or pilot may be transmitted on each of the N subbands in each symbol period. A data symbol is a modulation symbol for data, and a pilot symbol is a modulation symbol for pilot. If fewer than N subbands are used for transmission, then a signal value of zero is provided for each unused subband. For each symbol period, N symbols (i.e., data symbols, pilot symbols, and/or zeros) for the N subbands are transformed to the time domain using an N-point inverse fast Fourier transform (IFFT) to obtain a transformed symbol that contains N time-domain chips. To combat inter-symbol interference (ISI), a portion of each transformed symbol may be repeated to form a corresponding OFDM symbol that contains N+C chips, where C is the number of chips being repeated. The repeated portion is often referred to as a cyclic prefix. The OFDM symbol is then transmitted over a communication link.

A receiver obtains N+C input samples for the OFDM symbol, where each input sample corresponds to a transmitted chip. The receiver removes C input samples for the cyclic prefix and obtains a sequence of N input samples for the transformed symbol. The receiver may then perform an N-point fast Fourier transform (FFT) on the N input samples to obtain N frequency-domain received symbols for the N subbands. The received symbols may be expressed as:

$$X(k) = H(k)S(k) + N(k), \text{ for } k=0 \ldots (N-1), \quad \text{Eq (1)}$$

where S(k) is the symbol transmitted on subband k;
H(k) is the complex channel gain for subband k;
X(k) is the symbol received on subband k; and
N(k) is the noise at the receiver for subband k.

The receiver may recover the transmitted data symbols as follows:

$$\hat{S}(k) = \frac{X(k)}{\hat{H}(k)} \approx S(k) + \tilde{N}(k), \text{ for } k=0 \ldots (N-1), \quad \text{Eq (2)}$$

where $\hat{H}(k)$ is an estimate of the channel gain for subband k;
$\hat{S}(k)$ is an estimate of the symbol transmitted on subband k; and
$\tilde{N}(k)$ is the post-processed noise.

Equation (2) indicates that the data symbol S(k) transmitted on subband k may be recovered by dividing the received symbol X(k) for subband k by the channel gain estimate $\hat{H}(k)$ for subband k. This operation is commonly referred to as equalization. The receiver may estimate the channel gains based on pilot symbols transmitted by the transmitter.

If the receiver only needs to recover data on one or a few groups of subbands, then it is more efficient to perform processing for only the subbands of interest instead of all N subbands. The gain in efficiency is especially pronounced when N is large (e.g., N=4096). The transmitter may transmit pilot symbols on a group of subbands different from the groups of subbands used for data transmission. In this case, the receiver can estimate the channel gains for the data subbands (i.e., subbands used for data transmission) based on pilot symbols received on the pilot subbands (i.e., subbands used for pilot transmission).

Figure 2:
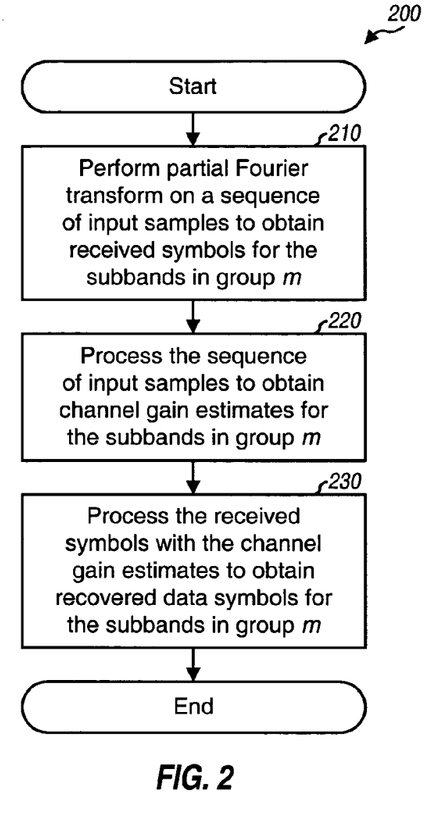
FIG. 2 shows a process for performing subband-based OFDM demodulation.

FIG. 2 shows a flow diagram of a process 200 for performing subband-based OFDM demodulation to recover data symbols transmitted on one group of subbands (group m) using pilot symbols transmitted on another group of subbands (group p). For the FDM scheme shown in FIG. 1B, group m includes subbands Lk+m, for k=0 ... ($N_c$-1), and group p includes subbands Lk+p, for k=0 ... ($N_c$-1), where $0 \leq m \leq (N_c-1)$ and $0 \leq p \leq (N_c-1)$.

Initially, a partial Fourier transform is performed on the sequence of N input samples to obtain a group of $N_c$ received symbols for the subbands in group m (step 210). The sequence of input samples is denoted as {x(n)}, which is x(n) for n=0 ... (N-1). The group of received symbols is denoted as {$X_m(k)$} or {X (Lk+m)}, which is X(Lk+m) for k=0 ... ($N_c$-1). The partial Fourier transform utilizes an $N_c$-point FFT instead of an N-point FFT and may be performed as described below.

The sequence of N input samples is also processed to obtain channel gain estimates for the subbands in group m (step 220). The channel gain estimates for group m are denoted as {$\hat{H}_m(k)$} or {$\hat{H}(Lk+m)$}, which is $\hat{H}(Lk+m)$, for k=0 ... ($N_c$-1). Step 220 may be performed with a partial Fourier transform and an inverse Fourier transform, as also described below. The received symbols for the subbands in group m are then processed with the channel gain estimates for the subbands in group m to obtain recovered data symbols for the subbands in group m, e.g., as shown in equation (2) (step 230). The recovered data symbols for group m are denoted as {$\hat{S}_m(k)$} or {$\hat{S}(Lk+m)$}, which is $\hat{S}(Lk+m)$, for k=0 ... ($N_c$-1).

The Fourier transform for the $N_c$ subbands in group m may be expressed as:

$$X(Lk+m) = \sum_{n=0}^{N-1} x(n) \cdot W_N^{(Lk+m)n}, \text{ for } k = 0 \ldots (N_c - 1), \quad \text{Eq (3)}$$

$$= \sum_{n=0}^{N-1} x(n) \cdot W_N^{mn} \cdot W_{N_c}^{kn}$$

where $$W_N^\alpha = e^{-j\frac{2\pi\alpha}{N}}$$

and x(n) is the input sample for sample period n. The following terms may be defined:

$$\tilde{x}_m(n) = x(n) \cdot W_N^{mn}, \text{ for } n=0 \ldots (N-1), \text{ and} \quad \text{Eq (4)}$$

$$g_m(n) = \sum_{i=0}^{L-1} \tilde{x}_m(n + N_c \cdot i), \text{ for } n = 0 \ldots (N_c - 1), \quad \text{Eq (5)}$$

where $\tilde{x}_m(n)$ is a rotated input sample obtained by rotating the input sample x(n) by $$W_N^{mn} = e^{-j\frac{2\pi mn}{N}},$$

which is a phasor that varies from sample to sample; and $g_m(n)$ is a time-domain value obtained by accumulating L rotated input samples that are spaced apart by $N_c$ samples. Equation (3) may then be expressed as:

$$X_m(k) = X(Lk+m) = \sum_{n=0}^{N_c-1} g_m(n) \cdot W_{N_c}^{kn}, \text{ for } k = 0 \ldots (N_c - 1). \quad \text{Eq (6)}$$

Figure 3:
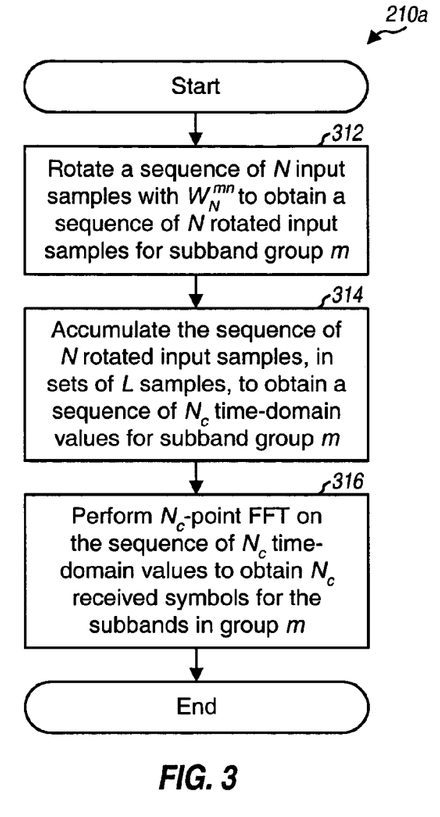
FIG. 3 shows a process for performing partial Fourier transform.

FIG. 3 shows a flow diagram of a process 210a for performing partial Fourier transform to obtain received symbols for one group of subbands. Process 210a may be used for step 210 in FIG. 2. Initially, the sequence of N input sample x(n) is rotated by multiplying each input sample by $W_N^{mn}$ to obtain a sequence of N rotated input samples for group m, which is denoted as $\{\tilde{x}_m(n)\}$, as shown in equation (4) (step 312). The sequence of N rotated input samples is then accumulated, in sets of L rotated input samples, to obtain a sequence of $N_c$ time-domain values for group m, which is denoted as $\{g_m(n)\}$, as shown in equation (5) (step 314). Each set includes every $N_c$-th samples in the sequence of rotated input samples, with the $N_c$ sets being associated with different starting rotated input samples in the sequence. An $N_c$-point FFT is then performed on the sequence of $N_c$ time-domain values to obtain $N_c$ received symbols for group m, as shown in equation (6) (step 316).

Figure 4:
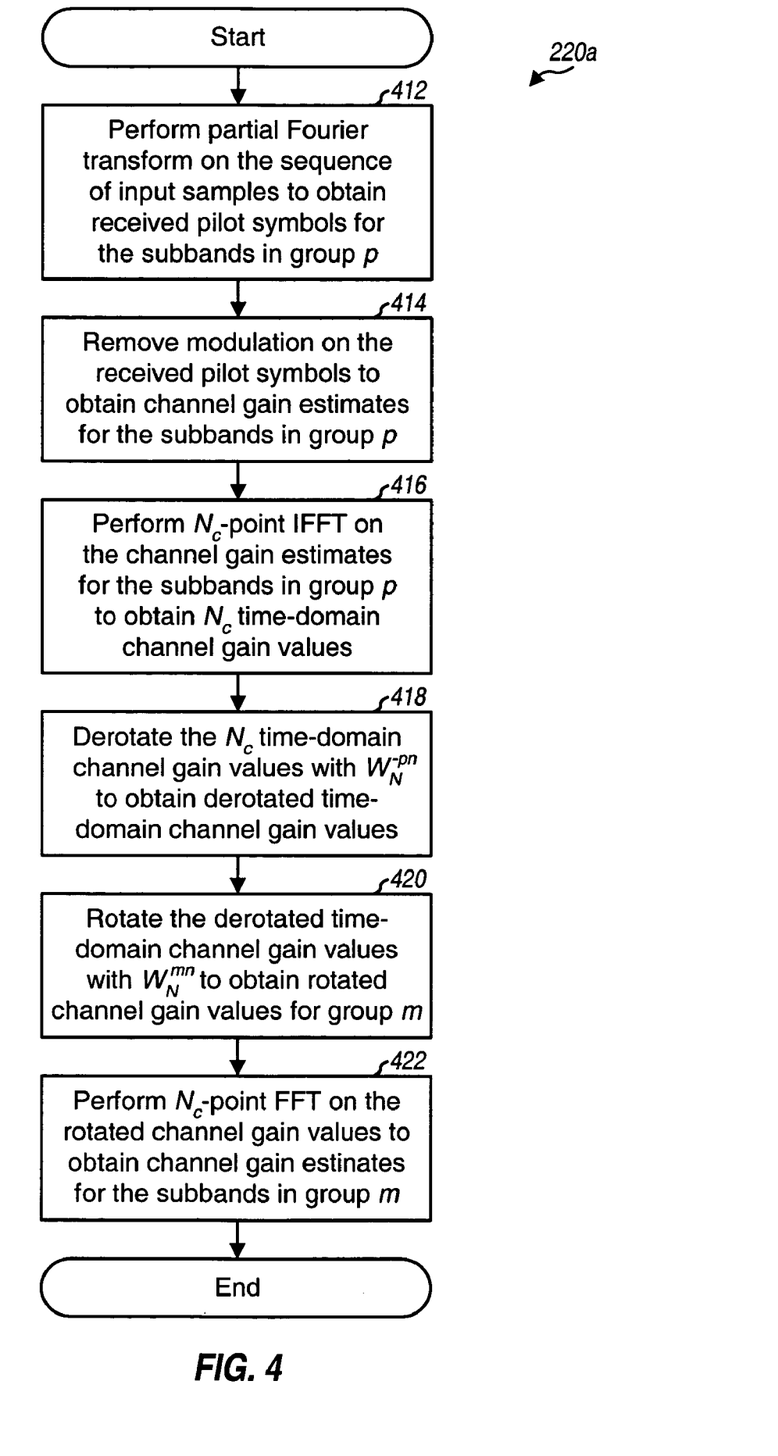
FIG. 4 shows a process for performing channel estimation.

FIG. 4 shows a process 220a for obtaining channel gain estimates for the subbands in group m based on pilot symbols received on the subbands in group p, where p≠m. Process 220a may be used for step 220 in FIG. 2. Initially, the received pilot symbols for the subbands in group p are obtained, for example, using process 210a described above for recovering the data symbols for the subbands in group m (step 412). The output of step 412 is $N_c$ received pilot symbols, which are denoted as X(Lk+p) or P̂(Lk+p), for k=0 ... ($N_c$−1).

The modulation on the received pilot symbols is then removed to obtain channel gain estimates for the subbands in group p (step 414), as follows:

$$\hat{H}_p(k) = \hat{H}(Lk+p) = \hat{P}(Lk+p) \cdot P^*(Lk+p), \text{ for } k=0 \ldots (N_c-1), \quad \text{Eq (7)}$$

where P(Lk+p) is the known pilot symbol for subband k in group p. The channel gain estimates for group p are denoted as $\{\hat{H}_p(k)\}$ or $\{\hat{H}(Lk+p)\}$, which is $\hat{H}(Lk+p)$ for k=0 ... ($N_c$−1). An $N_c$-point IFFT is then performed on the channel gain estimates for group p to obtain a sequence of $N_c$ time-domain channel gain values, $\{h_p(n)\}$, which consist of modulated time-domain channel estimates, $h_p(n) = h(n) \cdot W_N^{pn}$, for n=0 ... ($N_c$−1) (step 416). The sequence of $N_c$ time-domain channel gain values is then derotated by multiplication with $W_N^{-pn}$ to obtain a sequence of $N_c$ derotated time-domain channel gain values, as follows: $h(n) = h_p(n) \cdot W_N^{-pn}$, for n=0 ... ($N_c$−1) (step 418).

The channel gain estimates for the subbands in group m are then derived from the sequence of derotated time-domain channel gain values. The Fourier transform for the derotated channel gain estimates for $N_c$ subbands may be expressed as:

$$\hat{H}(k) = \sum_{n=0}^{N_c-1} h(n) \cdot W_N^{kn}, \text{ for } k = 0 \ldots (N_c - 1). \quad \text{Eq (8)}$$

The Fourier transform for the channel gain estimates for the subbands in group m may be expressed as:

$$\hat{H}_m(k) = \hat{H}(Lk+m) \quad \text{Eq (9)}$$

$$= \sum_{n=0}^{N_c-1} h(n) \cdot W_N^{(Lk+m)n}, \text{ for } k = 0 \ldots (N_c - 1),$$

$$= \sum_{n=0}^{N_c-1} h(n) \cdot W_N^{mn} \cdot W_{N_c}^{kn}$$

As indicated in equation (9), the channel gain estimates for the subbands in group m can be obtained by first multiplying the sequence of derotated time-domain channel gain values, $\{h(n)\}$, by $W_N^{mn}$ to obtain a sequence of rotated channel gain values (step 420). An $N_c$-point FFT is then performed on the sequence of rotated channel gain values to obtain the channel gain estimates for the subbands in group m (step 422). The derotation in step 418 and the rotation in step 420 may be combined, and the rotated channel gain values for group m may be obtained as $h_m(n) = h_p(n) \cdot W_N^{(m-p)n}$.

Figure 5:
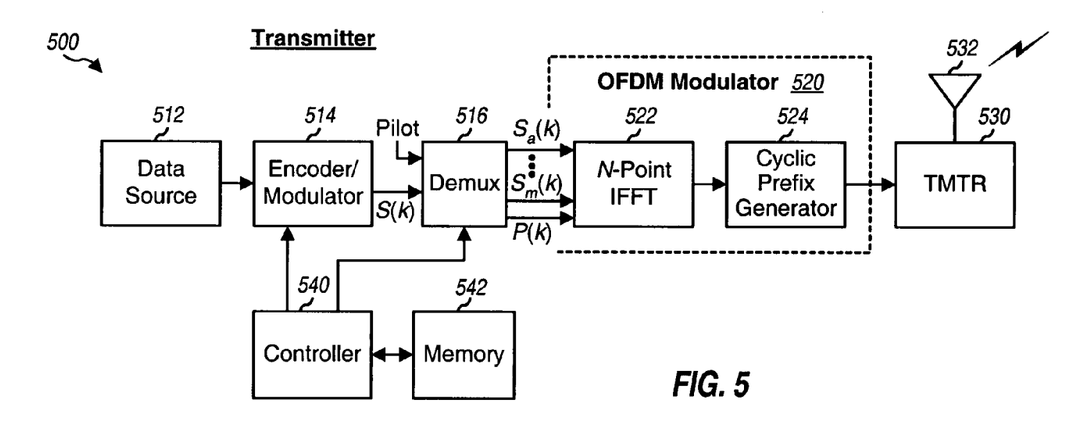
FIG. 5 shows a transmitter in the OFDM-based system.

FIG. 5 shows a block diagram of a transmitter 500 capable of transmitting data on one or more groups of subbands. For clarity, the following description is for data transmission on M groups of subbands (i.e., groups a through m) and pilot transmission on one group of subbands (i.e., group p).

At transmitter 500, an encoder/modulator 514 receives traffic data from a data source 512 and control data and other data from a controller 540. Encoder/modulator 514 processes (e.g., formats, encodes, interleaves, and modulates) the received data and provides a stream of data symbols, $\{S(k)\}$.

Each data symbol is a modulation symbol for a modulation scheme selected for use. A modulation symbol is a complex value for a specific point in a signal constellation corresponding to the selected modulation scheme. A demultiplexer (Demux) 516 receives the stream of data symbols, {S(k)}, and provides these data symbols to the subbands in groups a through m. Demultiplexer 516 also receives pilot symbols, P(k), which are modulation symbols known a priori by both the transmitter and receiver, and provides these pilot symbols to the subbands in group p. Demultiplexer 516 also provides a signal value of zero (a "zero" symbol) for each subband not used for data or pilot transmission.

An OFDM modulator 520 receives the symbols from multiplexer 516 and performs OFDM modulation on these symbols. OFDM modulator 520 includes an inverse fast Fourier transform (IFFT) unit 522 and a cyclic prefix generator 524. For each symbol period, IFFT unit 522 transforms N symbols to the time domain using an N-point inverse FFT to obtain a transformed symbol that contains N time-domain chips. Each chip is a complex value to be transmitted in one chip period. Cyclic prefix generator 524 then repeats a portion of each transformed symbol to form an OFDM symbol that contains N+C chips. A symbol period corresponds to the duration of one OFDM symbol, which is N+C chip periods. OFDM modulator 520 provides a sequence of N+C time-domain chips for each OFDM symbol.

A transmitter unit (TMTR) 530 receives and processes (e.g., converts to analog, filters, amplifies, and frequency upconverts) the stream of chips to obtain a modulated signal, which is then transmitted from an antenna 532. Controller 540 directs the operation at transmitter 500. A memory unit 542 provides storage for program codes and data used by controller 540.

Figure 6:
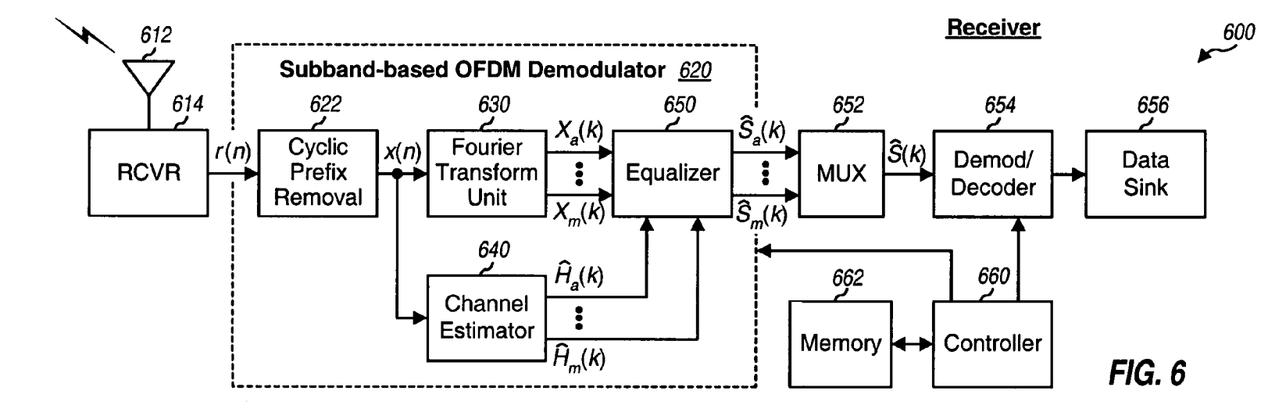
FIG. 6 shows a receiver in the OFDM-based system.

FIG. 6 shows a block diagram of a receiver 600 capable of performing subband-based OFDM demodulation to recover data on one or more, groups of subbands. Again, for clarity, the following description is for data reception on M groups of subbands (i.e., groups a through m) and pilot transmission on one group of subbands (i.e., group p). At receiver 600, the modulated signal transmitted by transmitter 500 is received by an antenna 612. A receiver unit (RCVR) 614 processes (e.g., frequency downconverts, filters, amplifies, and digitizes) the received signal from antenna 612 and provides input samples.

A subband-based OFDM demodulator 620 processes the input samples and provides recovered data symbols, which are estimates of the data symbols transmitted by transmitter 500. For the embodiment shown in FIG. 6, subband-based OFDM demodulator 620 includes a cyclic prefix removal unit 622, a Fourier transform unit 630, a channel estimator 640, and an equalizer 650. Cyclic prefix removal unit 622 removes the cyclic prefix in each received OFDM symbol and provides a sequence of input samples, {x(n)}, to both Fourier transform unit 630 and channel estimator 640. Fourier transform unit 630 performs partial Fourier transform on the input sample sequence for each of the M groups of subbands and provides M groups of received symbols, {$X_a(k)$} through {$X_m(k)$}, for the M subband groups. Channel estimator 640 derives channel gain estimates for each of the M groups of subbands, based on the sequence of input samples, and provides M groups of channel gain estimates, {$\hat{H}_a(k)$} through {$\hat{H}_m(k)$}, for the M subband groups. Equalizer 650 receives the M groups of received symbols and the M groups of channel gain estimates for the M subband groups, performs equalization on the received symbols as shown in equation (2), and provides M groups of recovered data symbols, {$\hat{S}_a(k)$} through {$\hat{S}_m(k)$}, for the M subband groups.

A multiplexer (MUX) 652 receives and multiplexes the recovered data symbols for the M subband groups and provides one stream of recovered data symbols, {$\hat{S}(k)$}. A demodulator/decoder 654 processes (e.g., demodulates, deinterleaves, and decodes) the recovered data symbol stream and provides decoded data to a data sink 656. A controller 660 directs the operation at receiver 600. A memory unit 662 provides storage for program codes and data used by controller 660.

Figure 7:
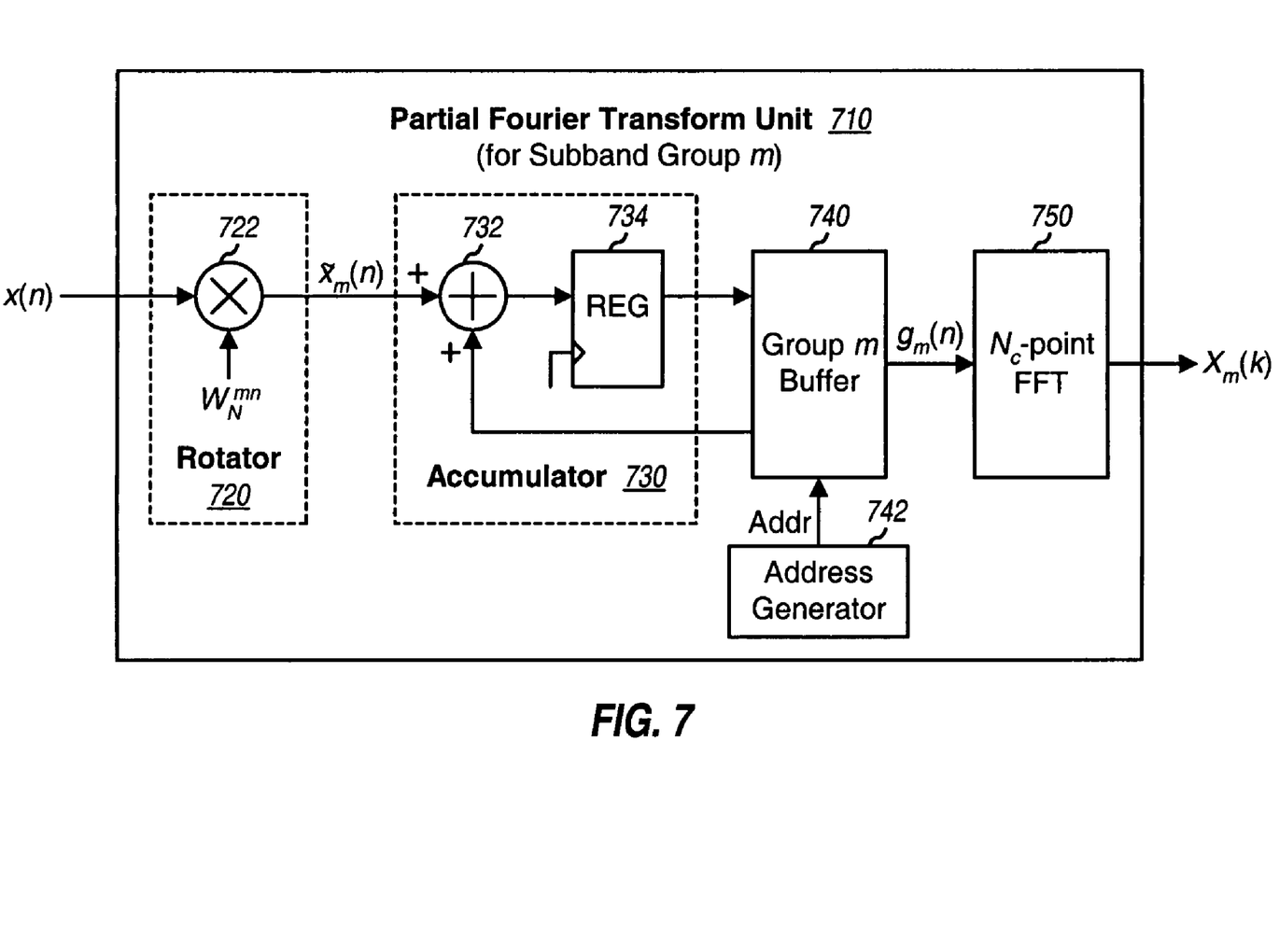
FIG. 7 shows a partial Fourier transform unit for one group of subbands.

FIG. 7 shows a block diagram of a partial Fourier transform unit 710 that may be used to obtain received symbols for one group of subbands. Unit 710 includes a rotator 720, an accumulator 730, a buffer 740, an address generator 742, and an $N_c$-point FFT unit 750. Buffer 740 stores the N, time-domain values, {$g_m(n)$}, for group m. At the start of each symbol period, buffer 740 is reset (i.e., filled with zeros).

Rotator 720 receives the sequence of input samples. A multiplier 722 within rotator 720 multiplies each input sample x(n) with $W_N^{mn}$ to obtain a corresponding rotated input sample $\tilde{x}_m(n)$, as shown in equation (4). Accumulator 730 performs accumulation for each of the $N_c$ time-domain values {$g_m(n)$}, as shown in equation (5). For each rotated input sample $\tilde{x}_m(n)$, the current value for the time-domain value $g_m(n)$ for this rotated input sample is retrieved from buffer 740 and provided to an adder 732. Adder 732 adds the rotated input sample $\tilde{x}_m(n)$ with the current value and provides an updated value to a register 734. Register 734 stores the updated value in the proper location of buffer 740 for the time-domain value $g_m(n)$.

For each input sample x(n), buffer 740 provides the current value for the corresponding time-domain sample $g_m(n)$ and stores the updated value. An address generator 742 generates the address for buffer 740 and may be implemented with a modulo counter. At the end of each symbol period, after all N input samples for the symbol period have been received and accumulated, FFT unit 750 performs an $N_c$-point FFT on the $N_c$ time-domain values {$g_m(n)$} from buffer 740 to obtain N, received symbols {$X_m(k)$} for the subbands in group m.

Figure 8:
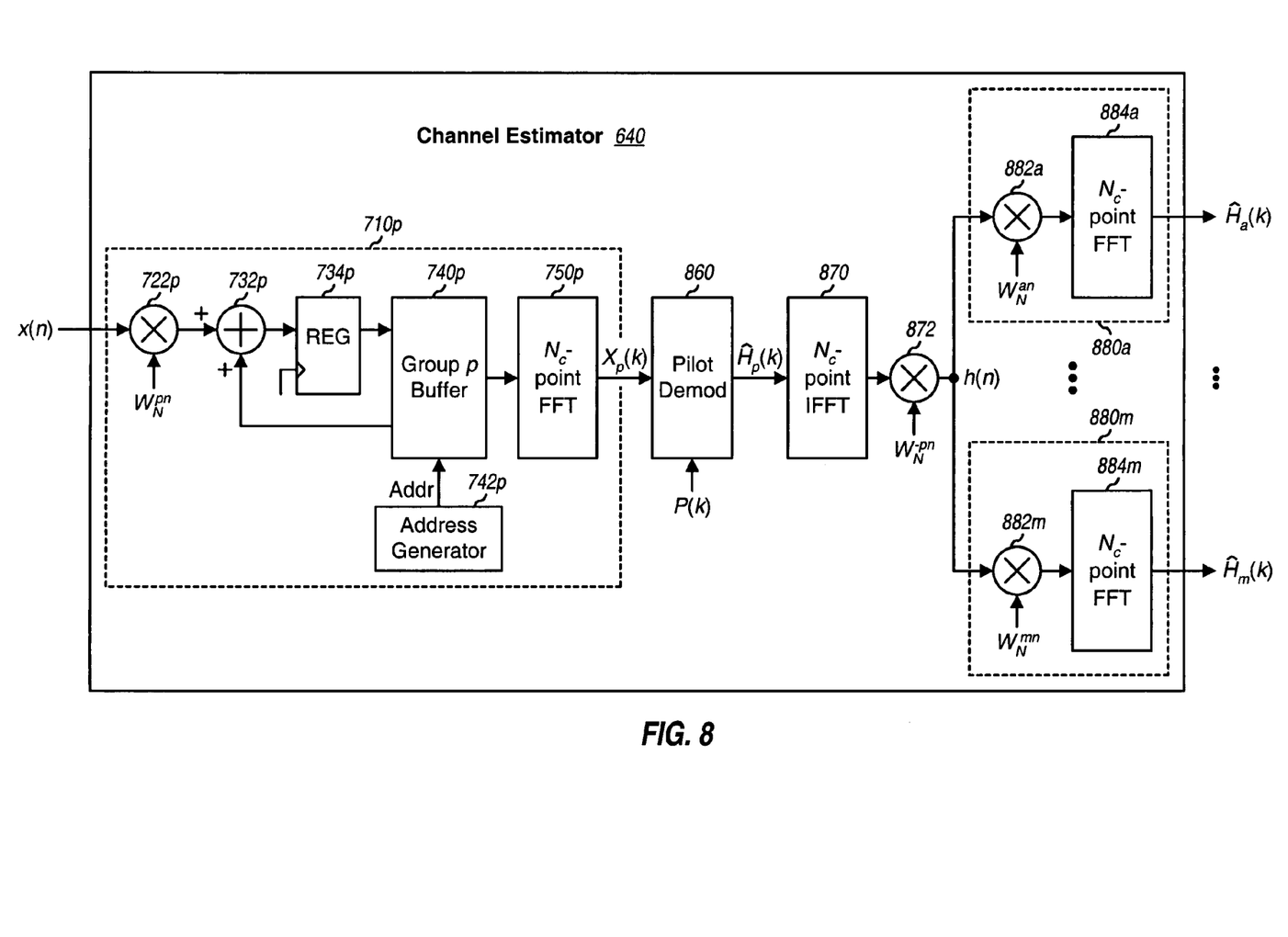
FIG. 8 shows a channel estimator.

FIG. 8 shows a block diagram of an embodiment of channel estimator 640, which can provide channel gain estimates for subband groups a through m based on pilot symbols received on subband group p. Channel estimator 640 includes a partial Fourier transform unit 710p, a pilot demodulation unit 860, an $N_c$-point IFFT unit 870, and M partial Fourier transform units 880a through 880m for the M subband groups.

Partial Fourier transform unit 710p receives and processes the sequence of input samples to obtain $N_c$ received symbols {$X_p(k)$} for the subbands in group p. Unit 710p is implemented in the same manner as unit 710 in FIG. 7, except that a multiplier 722p within a rotator 720p multiplies the input samples x(n) with $W_N^{pn}$, instead of $W_N^{mn}$, and provides rotated input samples $\tilde{x}_p(n)$. Pilot demodulation unit 860 multiplies the received symbols {$X_p(k)$} with the conjugated pilot symbols P*(Lk+p) to obtain the channel gain estimates {$\hat{H}_p(k)$} for the subbands in group p. IFFT unit 870 performs an $N_c$-point IFFT on the channel gain estimates {$\hat{H}_p(k)$} and provide time-domain channel gain estimates {$h_p(n)$}, and a multiplier 872 derotates the time-domain channel estimates {$h_p(n)$} by $W_N^{-pn}$ and provides $N_c$ derotated time-domain channel gain values {h(n)}.

Each transform unit 880 receives the $N_c$ derotated time-domain channel gain values {h(n)} and derives the channel gain estimates for the subbands in its assigned group. Each transform unit 880 includes a multiplier 882 and an $N_c$-point FFT unit 884. Within transform unit 880m for group m, a multiplier 882m multiplies the derotated time-domain channel gain values {h(n)} with $W_N^{mn}$. FFT unit 884m then performs an $N_c$-point FFT on the rotated channel gain values from multiplier 882m and provides $N_c$ channel gain estimates $\{\hat{H}_m(k)\}$ for group m. M transform units 880a through 880m provide M groups of channel gain estimates, $\{\hat{H}_a(k)\}$ through $\{\hat{H}_m(k)\}$, for subband groups a through m, respectively.

Filtering may be performed at various locations along the channel estimation processing path to obtain channel gain estimates with improved quality. As an example, the rotated input samples $\tilde{x}_p(n)$ may be averaged over multiple symbol periods prior to performing the $N_c$-point FFT with unit 750p. As other examples, filtering may be performed on (1) the received symbols $\{X_p(k)\}$ for the subbands in group p, (2) the channel gain estimates $\{\hat{H}_p(k)\}$ for the subbands in group p, (3) the time-domain channel gain estimates $\{h_p(n)\}$ for group p, (4) the derotated time-domain channel gain values $\{h(n)\}$, and so on.

The channel gain estimates for the data subbands may also be obtained in other manners. For example, the channel gain estimates for the subbands in group m may be obtained by performing (e.g., linear) interpolation on the channel gain estimates for the subbands in group p.

Figure 9:
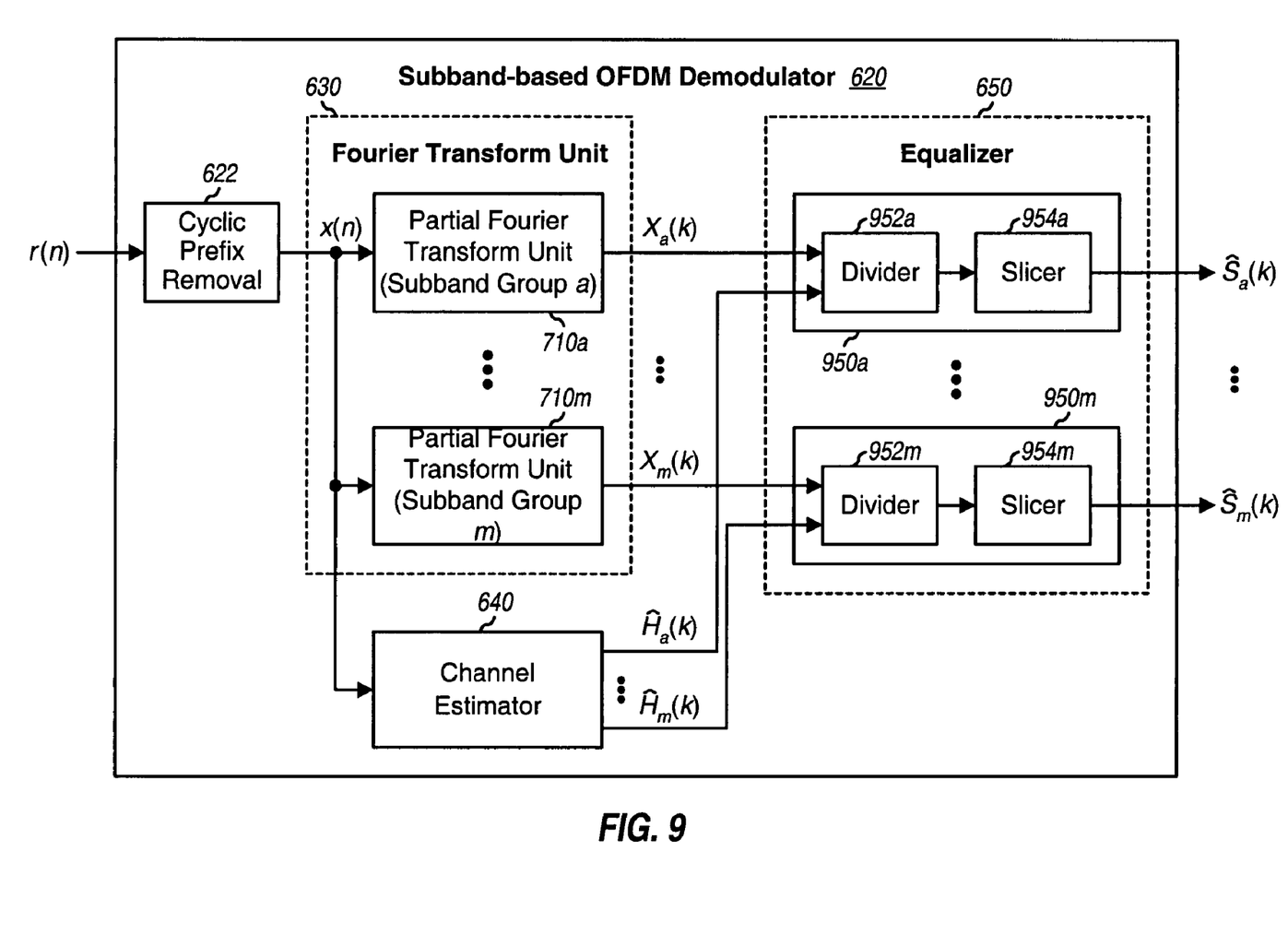
FIG. 9 shows a subband-based OFDM demodulator.

FIG. 9 shows a block diagram of an embodiment of subband-based OFDM demodulator 620. Within OFDM demodulator 620, cyclic prefix removal unit 622 receives the input samples and removes the cyclic prefix for each OFDM symbol and provides the sequence of input samples, $\{x(n)\}$, to Fourier transform unit 630 and channel estimator 640.

Fourier transform unit 630 includes M partial Fourier transform units 710a through 710m, one transform unit 710 for each of the M subband groups. Each partial Fourier transform unit 710l, where l=a ... m, is implemented as shown in FIG. 7. Fourier transform unit 710l for subband group 1 performs rotation on the sequence of input samples with $W_N^{ln}$, accumulates the rotated input samples $\{\tilde{x}l(n)\}$, performs an $N_c$-point FFT on the time-domain values $\{g_l(n)\}$, and provides received symbols $\{X_l(k)\}$ for the subbands in group l. Channel estimator 640 is implemented as shown in FIG. 8, processes the input samples as described above for FIG. 8, and provides channel gain estimates for each of the M subband groups.

Equalizer 650 includes M single-tap equalizers 950a through 950m, one equalizer 950 for each of the M subband groups. Each equalizer 950l, where l=a ... m, receives the group of received symbols, $\{X_l(k)\}$, and the group of channel gain estimates, $\{\hat{H}_l(k)\}$, for the associated subband group l. Within equalizer 950m for subband group m, a divider 952m divides the received symbol $X_m(k)$ for each subband by the channel gain estimate $\hat{H}_m(k)$ for that subband. A slicer 954m then slices (i.e., quantizes) the output of divider 952m and provides the recovered data symbol $\hat{S}_m(k)$. M equalizers 950a through 950m provide M groups of recovered data symbols, $\{\hat{S}_a(k)\}$ through $\{\hat{S}_m(k)\}$, for the M subband groups a through m.

FIG. 9 shows an exemplary receiver architecture in which a single-tap equalizer is used for each data subband. The received symbols and channel gain estimates may be processed in other manners. For example, matched filtering may be performed on the received symbols with the channel gain estimates. As another example, log-likelihood ratios (LLRs) may be computed for the received symbols and/or the channel gain estimates, and the LLRs may be processed by a Turbo decoder in an iterative manner.

The techniques described herein for performing partial Fourier transform, channel estimation, and OFDM demodulation (or simply, "subband-based OFDM demodulation" techniques) can simplify the receiver design and provide various benefits. To recover the data symbols for a given group of subbands, only FFTs of size $N_c$ are performed and no FFTs of size N are required. The rotation and accumulation for the M subband groups can be performed in parallel to avoid extra buffering. Alternatively, one set of hardware may be used to process the M subband groups in a time division multiplexed (TDM) manner to reduce hardware requirements.

Processing delay is also reduced since the rotation and accumulation for each subband group may be performed at the sample rate, i.e., on each input sample as it arrives at the receiver. The sequence of time-domain values, $\{g_m(n)\}$, for each subband group is available as soon as an entire OFDM symbol is received, without any additional delay. The channel gain estimates for each subband group are obtained based on the same sequence of derotated time-domain channel gain values, $\{h(n)\}$. Thus, the channel estimation for the M subband groups may be performed serially without requiring additional buffering.

For simplicity, the subband-based OFDM demodulation techniques have been described for the subband arrangement shown in FIG. 1B. These techniques may be used for other subband arrangements. In general, the subband groups may include the same number of subbands (as described above) or different number of subbands. Moreover, the subbands in each group may be selected in some other manners. The only requirement is for the subbands in each group to be uniformly distributed across the N total subbands in order to attain simplification in the FFT by decomposition into partial FFTs, as described above. For example, if N=4096, group 1 may include 32 subbands that are separated by 128 subbands, group 2 may include 1024 subbands that are separated by 4 subbands, and so on. The pilot subband group may also include the same or different number of subbands than the data subband groups. A different subband arrangement may result in a different phasor $W_N^{mn}$ being used for the rotation, a different number of rotated input samples being accumulated, and an FFT of a different size being performed to obtain the received symbols for a given subband group.

The subband-based OFDM demodulation techniques may be used for the downlink (i.e., forward link) as well as the uplink (i.e., reverse link). For the downlink, transmitter 500 is an access point and receiver 600 is a user terminal. For the uplink, transmitter 500 is a user terminal and receiver 600 is an access point. The techniques described herein may also be used for various OFDM-based systems (e.g., an OFDMA system).

For clarity, the subband-based OFDM demodulation techniques have been described for a single-input single-output (SISO) communication system. These techniques may also be used for a multiple-input single-output (MISO) system, a single-input multiple-output (SIMO) system, and a multiple-input multiple-output (MIMO) system. For a MIMO system, one Fourier transform unit 630 is provided for each of multiple ($N_R$) receive antennas at the receiver. Each Fourier transform unit 630 processes the input samples for an associated antenna and provides M groups of received symbols for M groups of subbands for that antenna. Spatial processing is then performed on $N_R$ collections of M groups of received symbols for the $N_R$ receive antennas to recover the data symbols. The spatial processing may be performed with a zero-forcing equalizer, a minimum mean square error (MMSE) equalizer, or some other type of equalizer.

The subband-based OFDM demodulation techniques described herein may be implemented by various means. For example, these techniques may be implemented in hardware, software, or a combination thereof. For a hardware implementation, the processing units used to perform subband-based OFDM demodulation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the subband-based OFDM demodulation techniques may be implemented with modules (e.g., procedures, functions, and so on) that perform the functions described herein. The software codes may be stored in a memory unit (e.g., memory unit 662 in FIG. 6) and executed by a processor (e.g., controller 660). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing channel estimation in a communication system, comprising:
    performing a Fourier transform on a sequence of input samples to obtain received pilot symbols for a first group of subbands;
    obtaining a first group of channel gain estimates for the first group of subbands based on the received pilot symbols;
    performing an inverse fast Fourier transform (IFFT) on the first group of channel gain estimates to obtain a sequence of time-domain channel gain values;
    rotating the sequence of time-domain channel gain values to obtain a first sequence of rotated channel gain values for a second group of subbands; and
    performing a fast Fourier transform (FFT) on the first sequence of rotated channel gain values to obtain a second group of channel gain estimates for the second group of subbands.

2. The method of claim 1, wherein the performing the Fourier transform includes
    rotating the sequence of input samples to obtain a sequence of rotated input samples,
    accumulating the sequence of rotated input samples, in sets of L rotated input samples, to obtain a sequence of time-domain input values, where L>1, and
    performing a fast Fourier transform on the sequence of time-domain input values to obtain the received pilot symbols.

3. The method of claim 1, further comprising:
    derotating the sequence of time-domain channel gain values to obtain a sequence of derotated time-domain channel gain values, and wherein the sequence of derotated time-domain channel gain values is rotated to obtain the first sequence of rotated channel gain values for the second group of subbands.

4. The method of claim 1, further comprising:
    rotating the sequence of time-domain channel gain values to obtain a second sequence of rotated channel gain values for a third group of subbands; and
    performing a fast Fourier transform on the second sequence of rotated channel gain values to obtain a third group of channel gain estimates for the third group of subbands.

5. The method of claim 1, wherein the first group of channel gain estimates is obtained by multiplying each of the received pilot symbols with a conjugated pilot symbol corresponding to the received pilot symbol.

6. An apparatus operable to perform channel estimation in a communication system, comprising:
    a Fourier transform unit operative to perform a Fourier transform on a sequence of input samples to obtain received pilot symbols for a first group of subbands;
    a pilot demodulator operative to obtain a first group of channel gain estimates for the first group of subbands based on the received pilot symbols;
    an inverse fast Fourier transform (IFFT) unit operative to perform an inverse fast Fourier transform on the first group of channel gain estimates to obtain a sequence of time-domain channel gain values;
    a first rotator operative to rotate the sequence of time-domain channel gain values to obtain a first sequence of rotated channel gain values for a second group of subbands; and
    a first fast Fourier transform (FFT) unit operative to perform a fast Fourier transform on the first sequence of rotated channel gain values to obtain a second group of channel gain estimates for the second group of subbands.

7. The apparatus of claim 6, wherein the Fourier transform unit includes a second rotator operative to rotate the sequence of input samples to obtain a sequence of rotated input samples,
    an accumulator operative to accumulate the sequence of rotated input samples, in sets of L rotated input samples, to obtain a sequence of time-domain input values, where L>1, and
    a second fast Fourier transform unit operative to perform a fast Fourier transform on the sequence of time-domain input values to obtain the received pilot symbols.

8. The apparatus of claim 6, further comprising:
    a second rotator operative to rotate the sequence of time-domain channel gain values to obtain a second sequence of rotated channel gain values for a third group of subbands; and
    a second fast Fourier transform unit operative to perform a fast Fourier transform on the second sequence of rotated channel gain values to obtain a third group of channel gain estimates for the third group of subbands.

9. An apparatus operable to perform channel estimation in a communication system, comprising:
    means for performing a Fourier transform on a sequence of input samples to obtain received pilot symbols for a first group of subbands;
    means for obtaining a first group of channel gain estimates for the first group of subbands based on the received pilot symbols;
    means for performing an inverse fast Fourier transform (IFFT) on the first group of channel gain estimates to obtain a sequence of time-domain channel gain values;
    means for rotating the sequence of time-domain channel gain values to obtain a first sequence of rotated channel gain values for a second group of subbands; and
    means for performing a fast Fourier transform (FFT) on the first sequence of rotated channel gain values to obtain a second group of channel gain estimates for the second group of subbands.

* * * * *